United States Patent [19]

Hoag

[11] 4,336,418

[45] Jun. 22, 1982

[54] LAMINATED JUNCTION BOX MODULE AND LAMINATED PLUG-IN ACCESSORY MODULES SELECTIVELY USABLE THEREWITH

[76] Inventor: Richard L. Hoag, 18663 - 26 Mile Rd., Albion, Mich. 49224

[21] Appl. No.: 210,163

[22] Filed: Nov. 25, 1980

[51] Int. Cl.³ .............................................. H02G 3/18
[52] U.S. Cl. ................................ 174/53; 200/51 R; 200/297; 339/95 D; 339/122 R
[58] Field of Search ........... 174/53; 339/95 D, 122 R; 200/51 R, 296, 297

[56] References Cited

U.S. PATENT DOCUMENTS

| | | | |
|---|---|---|---|
| 2,410,287 | 10/1946 | Jaberg | 174/53 |
| 2,433,917 | 1/1948 | McCartney | 174/53 |
| 2,920,303 | 1/1960 | Johnson | 174/53 |
| 3,609,647 | 9/1971 | Castellano | 339/122 R |
| 3,922,478 | 11/1975 | Perkey | 174/53 |
| 4,103,125 | 7/1978 | Marrero | 200/51 R |
| 4,165,443 | 8/1979 | Figart et al. | 174/53 |

*Primary Examiner*—John W. Shepperd
*Attorney, Agent, or Firm*—Robert Brown, Jr.

[57] ABSTRACT

A unitary rectangular junction box module composed of a back rectangular base block molded from non-conductive material and having parallel bus bars laid edgewise in its front face and arranged lengthwise of its opposite side walls, the opposite ends of the bars terminating short of the outer surfaces of its end walls, in combination with a front rectangular block having a centrally disposed rectangular opening extending rearwardly therethrough, the marginal back face of the front block being laminated to the marginal borders of the front face of the back block to thereby lock the opposite ends of each bus bar between the block while leaving the intermediate bar segments accessible through said opening. The opening also may be used to telescopically receive selected unitary plug-in accessory modules for use with the junction box module.

The junction box module is further characterized by: a one-way coupler formed integrally with the opposite ends of each bus bar and adapted to grip the end of an external wire when pushed through a guide port leading from the exterior to the coupler; a release port individual to each coupler through which a pointed tool may be inserted into engagement with the coupler to release the connected wire, and by at least one of the bus bars with a break-out segment between its couplers and which may be removed, as required, to alter the circuitry of the junction box module to accommodate the circuits of the accessory modules.

6 Claims, 24 Drawing Figures

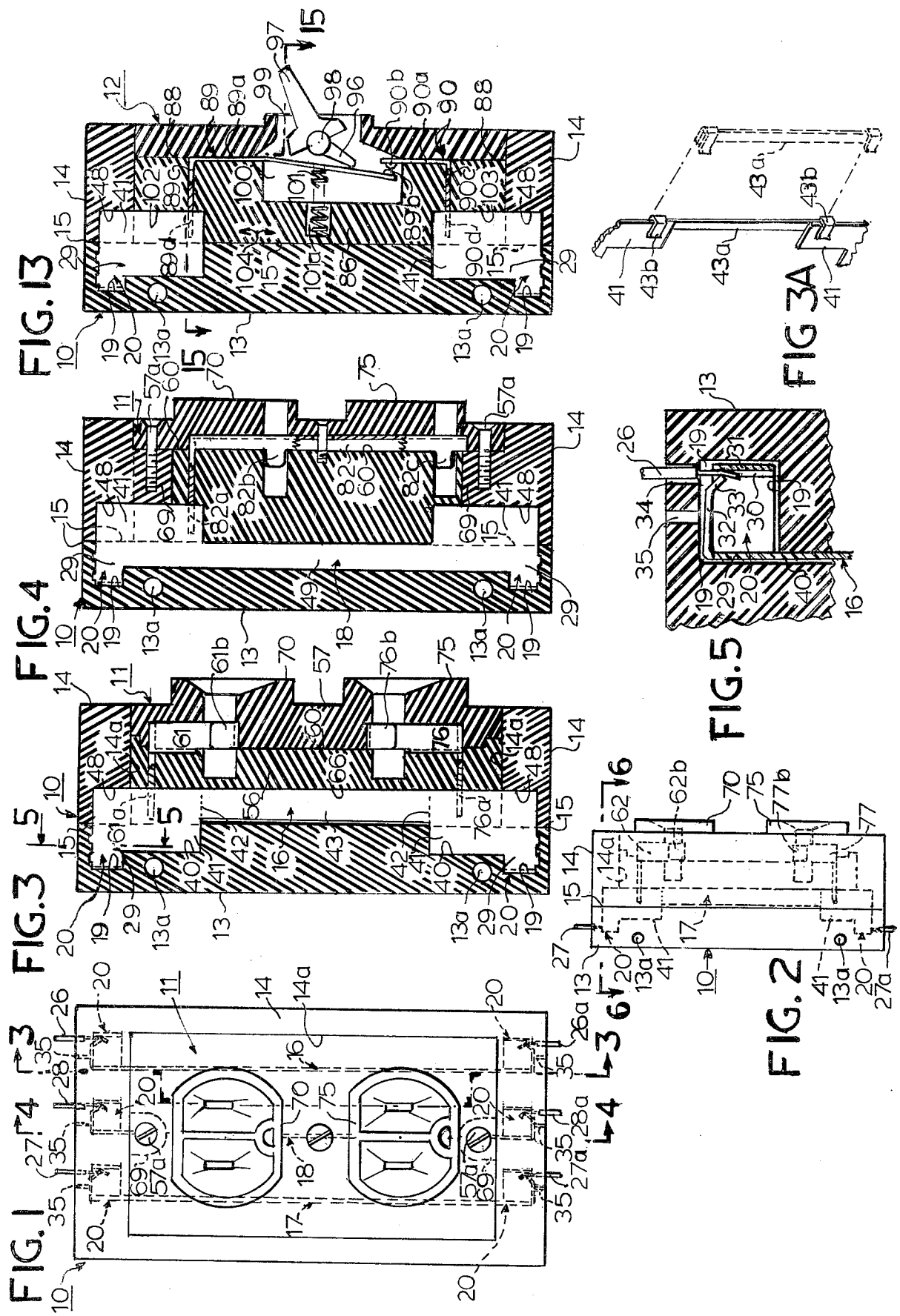

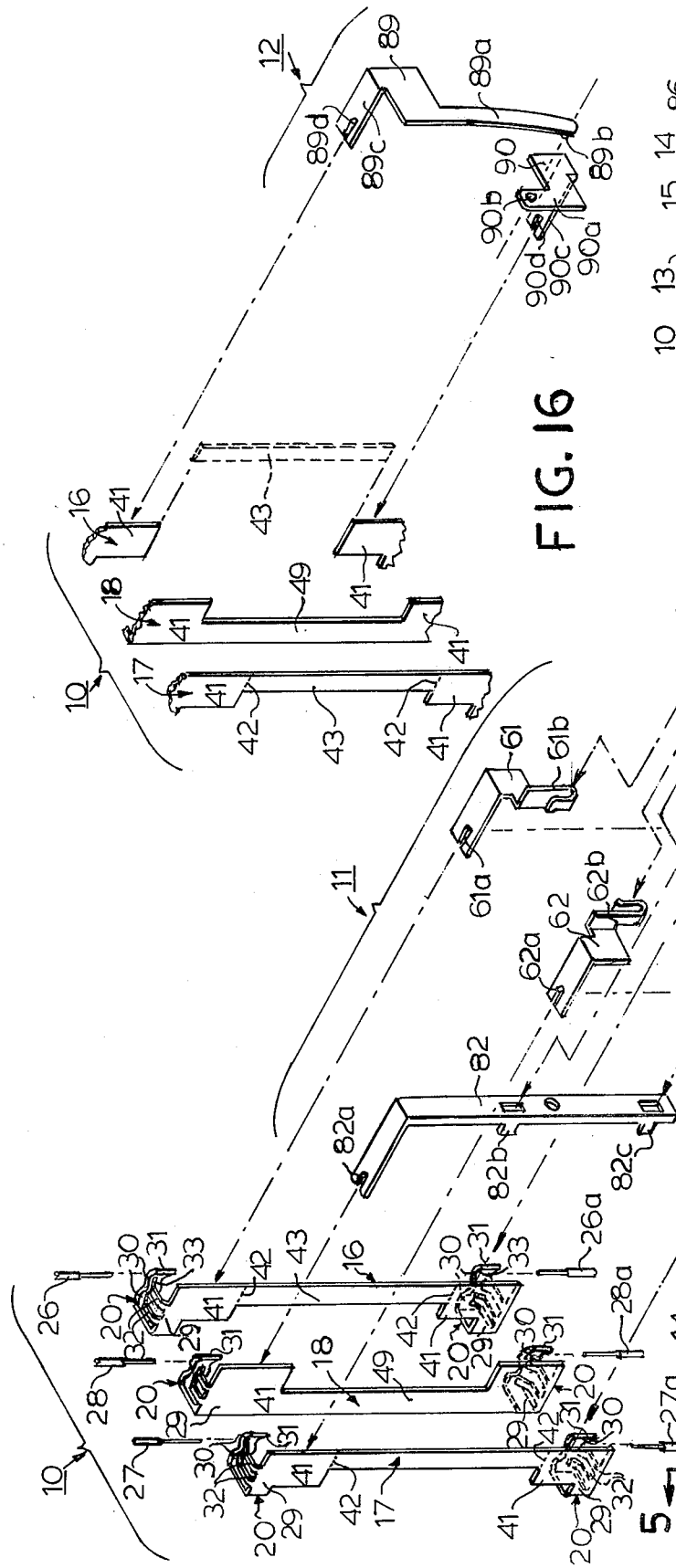
FIG. 16
FIG. 7
FIG. 6
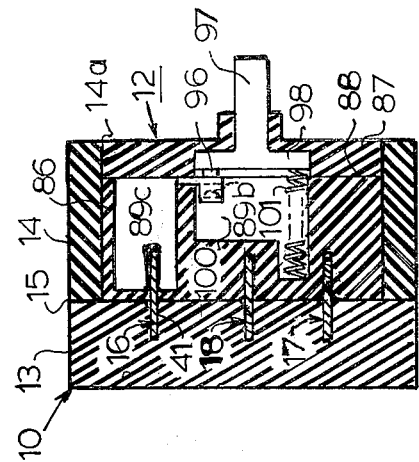
FIG. 15

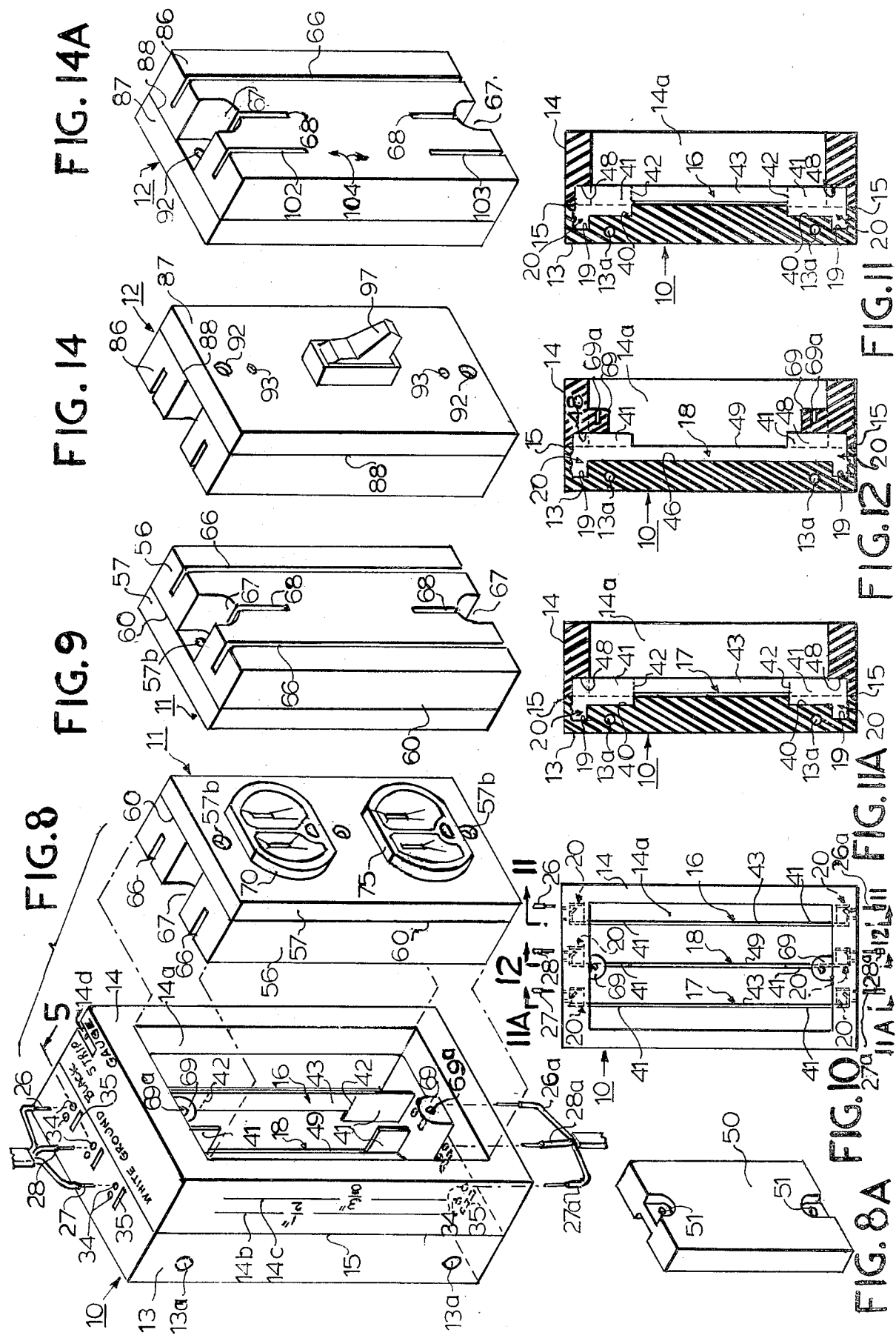

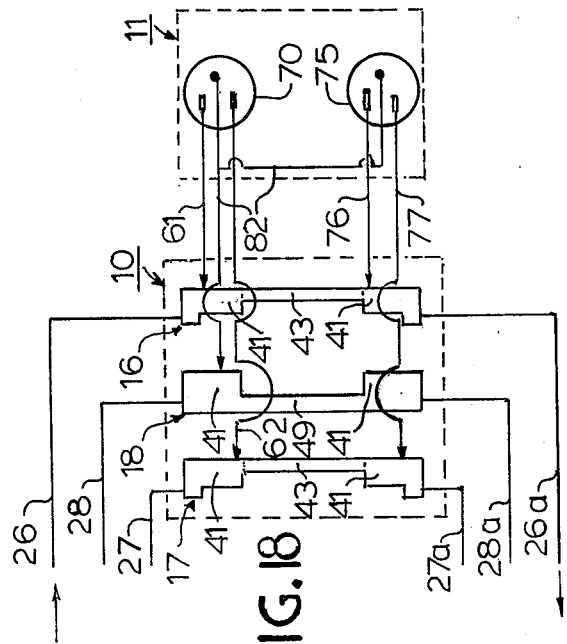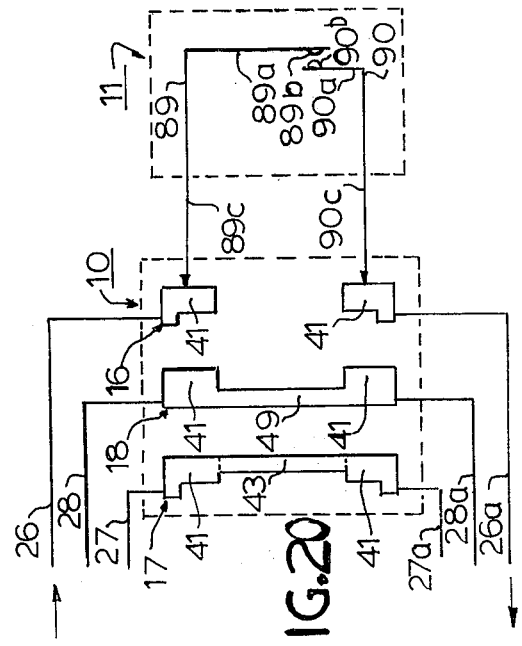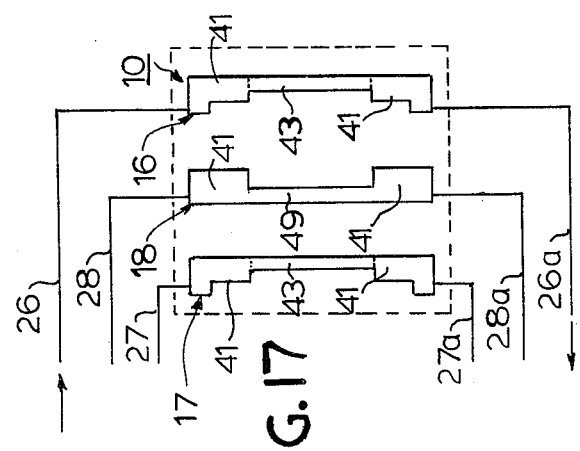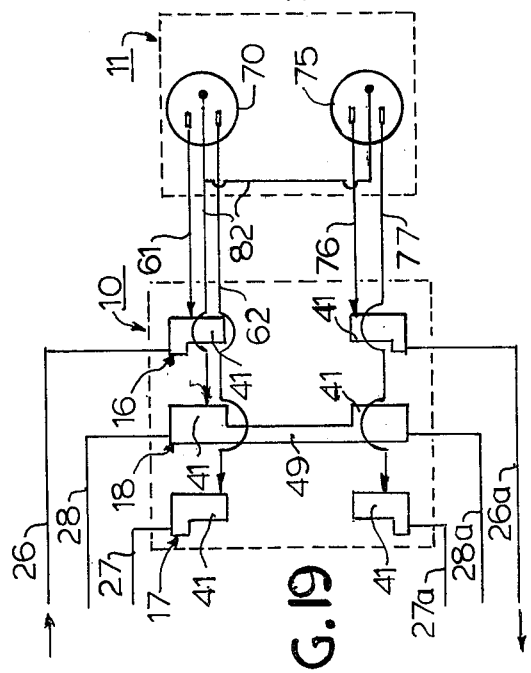

LAMINATED JUNCTION BOX MODULE AND LAMINATED PLUG-IN ACCESSORY MODULES SELECTIVELY USABLE THEREWITH

This invention relates to improvements in electrical outlet equipment and more especially to junction boxes usable selectively with a range of different plug-in accessories such as generally disclosed in the Peck U.S. Pat. No. 2,197,897, the Jaberg U.S. Pat. No. 2,410,287, and the Perkey U.S. Pat. No. 3,922,478. The equipment described in each of these patents is handicapped by complexity of structure, excessive time, labor and expense required for manufacture and installation, and by the absence of essential safety features to prevent mistakes in wiring and injury during installation and maintenance.

So far as applicant is aware, neither of the above-mentioned patents nor other prior art disclose the specific characteristics recited in the abstract above along with the resulting advantages set forth in the objects of invention below.

It is therefore an object of this invention to provide novel improvements in electrical outlet structures commonly used in three-wire systems and which comprises a base module with which interchangeable plug-in modules may be used. More specifically, this invention features a wireless base module which functions as a junction box and, in addition, is provided with the essential circuitry adapted for or easily adaptable to accommodate different accessory modules.

It is another object of invention to provide a preassembled electrical structure of the type described wherein the base module comprises a non-conductive unitary housing enclosing a plurality of bus bars, each having a pair of one-way wire couplers formed integrally with its opposite ends, respectively, and wherein each coupler is adapted to automatically grip and lock the stripped end of an external wire against withdrawal in response to external axial pressure applied to the wire while being inserted. The coupler is further adapted to release the locked wire for withdrawal in response to externally applied pressure.

It is a further object of invention to provide electrical outlet equipment consisting of a plurality of preassembled unitary modules, each of which is composed of a pair of rectangular molded blocks of non-conductive material laminated face-to-face with bar-type conductive parts locked therebetween.

It is yet another object of this invention to provide: electrical modules of the types described which are more compact, simpler in construction, more easily assembled by the manufacturer and installed by the electrician, and which require minimum maintenance while affording maximum protection against the hazards of faulty wiring.

Some of the objects of invention having been stated, other objects will appear as the description proceeds when taken in connection with the accompanying drawings, in which, FIG. 1 is a front elevation of my junction box or base module plugged in with a wireless receptacle module;

FIG. 2 is an elevational view looking at the left-hand side of FIG. 1;

FIG. 3 is a vertical sectional view taken along line 3—3 in FIG. 1;

FIG. 3A is an isometric view showing a bus bar having a removable and replaceable break-out segment;

FIG. 4 is a vertical sectional view taken along line 4—4 in FIG. 1;

FIG. 5 is a sectional detail view of a typical connector 20 for the opposite ends of each bus bar in the base module 10;

FIG. 6 is a sectional plan view taken along line 6—6 in FIG. 2;

FIG. 7 is an exploded isometric view of the conductive bar-type elements incorporated in combined base and receptacle modules 10 and 11, respectively;

FIG. 8 is an exploded isometric view of the combined base and receptacle modules 10 and 11, respectively;

FIG. 8A is an isometric view of a cover or closure 50 for the base module 10 shown in FIGS. 1 and 8;

FIG. 9 is an isometric view of the opposite side of the receptacle module 11 to that shown in FIG. 8;

FIG. 10 is a front elevation of the base module with cover 50 removed;

FIG. 11 is a vertical sectional view taken along line 11—11 in FIG. 10, said view being substantially identical to FIG. 3 but without the receptacle module 11;

FIG. 11A is a view taken along line 11A—11A in FIG. 10, showing the white or neutral bus bar;

FIG. 12 is a vertical sectional view taken along line 12—12 in FIG. 10, showing the ground bus bar 18, said view being substantially identical to FIG. 4 but without the receptacle module;

FIG. 13 is a vertical sectional view similar to FIG. 3, but showing a wireless switch module 12 assembled with the base module 10 instead of the module 11;

FIG. 14 is an isometric front view of the switch module;

FIG. 14A is an isometric rear view of FIG. 14;

FIG. 15 is a sectional plan view taken along line 15—15 in FIG. 13;

FIG. 16 is an exploded isometric view (on the same sheet of drawings as FIG. 7), showing the connection between modules 10 and 12;

FIG. 17 is a diagram of the circuitry of base module 10;

FIG. 18 is a diagram of the circuitry of the base module combined with the receptacle module 11 when the sockets 70 and 75 are connected in series;

FIG. 19 is a diagram similar to that shown in FIG. 18, but with the sockets connected in parallel, and FIG. 20 is a diagram of the circuitry of the base module when combined with the switch module 12.

Referring more particularly to the drawings, the numeral 10 denotes the junction box or base module which may be used alone or interchangeably with accessory equipment such as a wireless receptacle module 11 (FIG. 8), a wireless switch module 12, or with similar electrical equipment.

Module 10 is composed of a generally rectangular back section 13 laminated or adhesively attached to the front section 14 substantially along interfacial plane 15, the latter being parallel to the front and rear surfaces of the module. Laterally spaced bus bars 16, 17 and 18 are secured edgewise between sections 13 and 14, preferably at right angles to plane 15. As best shown in FIGS. 1, 5, 7 and 8, the opposite upper and lower ends of bus bar 16 are connectable between external wires 26, 26a by means of couplers 20, 20 to provide an energizable hot line through the base module. Similarly, the opposite ends of bus bar 17 are connectable between external wires 27, 27a to provide a neutral line, while the opposite ends of bus bar 18 are connectable between external wires 28, 28a to provide a ground line. In the following description, the conductive elements in the hot, neutral and ground lines will sometimes be referred to as "black", "white" and "ground" lines, respectively.

The front section 14 module 10 has a rectangular opening 14a therein which extends forwardly from the front face of the back section 13, that is, from plane 15, to the front of the module, said opening adapted to telescopically receive either of the abovementioned accessory modules 11 and 12. When, however, the module 10 is used alone as a junction box, a cover 50 (FIG. 8A) is telescopically inserted into opening 14a and detachably secured in position by by suitable screws, not shown, which penetrate bores 51, 51 in the cover and are threadably secured in bores 69a, 69a of the base module (FIG. 8).

Referring again to FIGS. 5, 7 and 8, it will be observed that each of the couplers 20 is U-shaped and has a leg 29 which forms an integral part of the end of its associated bus bar. Moreover, the U-shaped coupler extends laterally from the end portion of the bus bar and is disposed in a recess 19 provided in the end wall of module 10. The other leg 31 of coupler 20 is provided with a pair of vertically disposed parallel grooves 30, 30 therein, each of which cooperates with a bent end 33 of a cantilevered spring finger 32 which has its other end integral with leg 29. The bent end 33 cooperates with groove 30 to permit the stripped end of one of the external wires 26, 26a, 27, 27a, 28, 28a to be pushed therebetween, but automatically locks the wire when pulled in the reverse direction. In other words, each bent end 33 and its groove 30 forms a one-way wire clamp. A port 34 extends from each bent end 33 and associated groove 30 and outwardly through the end wall of back section 13 to the exterior, said port being adapted to guide the external wire end into engagement with the bent finger end 33 and associated groove 30. Since the stripped wire end has a diameter slightly greater than the width of the space between the bent end 33 and groove 30, the spring finger 32 will deflect inwardly of the module in response to the pressure exerted by the wire as its end is being inserted. Thus, each coupler 20 allows the wire end to slide in clamped position under axial wire pressure during insertion, but automatically locks the wire against withdrawal in any clamped position.

In order to release each locked wire end from its clamped position in coupler 20, a port 35 is provided which extends from a point in recess 19 adjacently above the free end portion of the finger 32 to the exterior of the module. By inserting a pointed tool, such as a screw driver, into port 35 and pressing the free end of finger 32 inwardly, the locked wire end will be unclamped so that the wire may be pulled out of port 34.

The extra guide ports 34 and associated one-way wire clamping means 30, 33, as well as the extra release ports 35, function as described above, and are provided for added wire capacity, independent control of multiple-socket outlets, circuit continuation, and added capacity when the module 10 is used in combination with plug-in accessories 11 and 12 later described.

Back section 13 has transversely extending mounting holes 13a therein for use when attaching the base module to a building structure. Suitable guide lines 14b and 14c are provided on the exterior side wall of module 10 (FIG. 8) for use when installing the module at a desired depth relative to the finish line of the building wall. Also, a strip gauge 14d is provided so that the precise amount of insulation may be removed from each wire for coupling purposes.

The above-described coupler recesses 19 each extend rearwardly from the interfacial plane 15 into the back section 13, there being a pair of upper and lower recesses 19, 19 for each of the bus bars 16, 17 and 18. Relatively short alined grooves 40, 40 extend downwardly and upwardly from the upper and lower recesses, respectively, so as to receive the rear marginal edge borders of the upper and lower wide ends 41, 41 of the black and white bus bars 16 and 17. It will be observed from FIGS. 3, 4, 8, 11 and 11A that the proximate edges of each pair of wide ends 41, 41 for bus bars 16 and 17 are scored as at 42, 42, said scored edges of the bus bars 16 and 17 each being connected by an intermediate break-out segment 43 which may be removed to accommodate the circuits of plug-in accessory modules described in detail hereinafter.

The white bus bar 17 is identical to and mounted in module 10 in the same manner as bus bar 16; however, bar 17 is connectable between external wires 27 and 27a while bar 16 is connectable between external wires 26 and 26a.

Although the ground bus bar 18 has wide ends 41, 41 identical to those on bars 16 and 17, it differs in that its wide ends are connected by permanently attached intermediate segment 49 which is not removable (FIGS. 4 and 12). Moreover, the rear vertical edges of the ends 41, 41 of bar 18 are alined with the rear vertical edge of segment 49, said alined edges being insertable in groove 46 of back section 13. In contrast, the front vertically alined edges of the ends 41, 41 for each of the bus bars 16 and 17 are in alinement with the front edges of their respective break-out segments 43, 43 thereby positioning the latter segments forwardly of interfacial plane 15 where they are accessible for removal. Since the break-out segment 49 is never required to be removed, it is positioned rearwardly of plane 15 and in groove 46 as described above.

If desired, the bus bars 16 and 17 may be provided with removable and replaceable breakout segments 43a as shown in FIG. 3A instead of the break-out segments 43. Segment 43a is provided with clips 41b, 41b integral with its upper and lower ends, respectively, which clips are adapted to be removably fastened to the upper and lower ends 41 of each bus bar 16 and 17.

Ordinarily, there is no need to remove segments 43 from either of the bus bars 16 and 17 when the base module is used as a junction box. But when used in combination with plug-in accessory modules such as 11 and 12, removal of one or both segments is sometimes necessary. By providing removable break-out segments 43 or removable and replaceable segments 43a in both bus bars, the base module 10 is standardized for use in several different applications and to minimize production and manufacturing time and costs.

The upper and lower front vertical edges of the ends 41, 41 for each of the three bus bars 16, 17 and 18 extend forwardly of the interfacial plane 15 and fit into vertical grooves 48 in the rear face of front section 14 (FIGS. 3, 4, 11, 11A and 12) to thereby lock the upper and lower ends of each of the bars and their respective couplers 20 between the laminated front and back sections 13 and 14.

The manufacturer preassembles base module 10 by inserting bus bars 16, 17 and 18 and their respective pairs of end couplers 20, 20 into the recesses 19. In these inserted positions, the rear edge portions of ends 41, 41 of bus bars 16 and 17 are disposed in grooves 40, 40, respectively, provided in the front face of the back section 13 as shown in FIGS. 11 and 11A. The rear edge portions 41, 41 and the intermediate segment of ground bar 18 are disposed in groove 49 as shown in FIG. 10. With the three bus bars inserted in this manner, the rear marginal face of the front section 14 is placed into face-to-face contact with said front face at plane 15. Then, the grooves 48 of the front section 14 fit over the forward vertical edge portions of the three pairs of bus bar ends 41, 41. Finally, the two sections 13 and 14 are permanently laminated along interface 15 to form a unitary base module or unit.

The circuitry for base module 10 is diagrammatically illustrated in FIG. 17 and briefly described below. External black wire 26 is the power entrance, the current entering the module at bore 34 and making contact with the contained bus bar 16 at point 41. Power then flows thru bar 16 to the lower point 41 where external wire 26a makes contact and then flows out wire 26a to a power using device or control. The numeral 27 designates the white or neutral external wire which enters module 10 at a bore 34, then flows through upper point 41, through break-out segment 43 and lower point 41 to external wire 27a which continues to a power using device or control. The external grounf wire 28 enters the module is the same manner, making contact with the enclosed ground bus bar 18, then continuing through the module and making contact with external wire 28a.

The receptacle module 11 may be used in combination with base module 10 by removing closure 50 from front opening 14a and telescopically inserting the receptacle module therein, the inserted module being removably secured in operative position by suitable screws 57a, 57a, said screws penetrating bores 57b, 57b of front section 57 and having their inner ends threadably secured in bores 69a, 69a of base module 10 (FIGS. 8, 10, and 12). Like module 10, the receptacle module 11 is composed of back and front rectangular sections 56 and 57 which, in turn, are laminated along an interfacial plane 60 into a unitary structure to thereby lock the bar-type connectors 61, 62, 76, 77 and 82 in position. When module 11 is in operative position (FIGS. 3 and 4) the plane 60 is substantially parallel to plane 15 of module 10 and perpendicular to the axis of insertion of the receptacle module.

As better shown in FIGS. 3, 7 and 8, the upper rearwardly projecting leg of bar-type connector 61 lies in a horizontal plane disposed substantially at right angles to the plane of black bus bar 16 and its upper and lower wide ends 41, 41, said leg having an end notch 61a adapted to straddle, abut and releasably contact the proximate front edge of said upper bus bar end 41. The lower end of the connector is provided with a clip-type contact 61b which serves as one of the terminals of upper socket 70. Likewise, a bar-type white connector 62 has an end notch 62a in its upper rearwardly extending leg which is adapted to straddle, abut and releasably contact the front edge of the upper wide end 41 of bus bar 17, the lower end of connector 62 having a clip-type contact 62b serving as another terminal in socket 70. Contacts 61b, 62b are adapted to receive prongs 71 and 72, respectively, of plug 73.

The lower socket 75 is connectable in the same manner to the lower front edges 41, 41 of bars 16 and 17 as described in connection with upper socket 70 by means of black and white bar-type connectors 76 and 77, respectively. More particularly, one end of connector 76 is provided with an end notch 76a adapted to straddle abut and releasably engage the lower front edge of end 41 of black bus bar 16 while a clip-type contact 76b on its other end serves as a terminal in socket 75; and, as previously described, one end of a connector 77 is provided with a notch 77a engageable with the lower front edge of white bus bar end 41 while clip-type connector 77b on its other end serves as a second terminal in socket 75. Contacts 76b and 77b are adapted to receive prongs 78 and 79, respectively, of lower appliance plug 80. Furthermore, an inverted L-shaped bar-type ground connector 82 is mounted in module 11 for connecting ground prongs 83 and 84 of the upper and lower appliance plugs 73 and 80, respectively, to ground bus bar 18, said connector 82 having an end notch 82a in its horizontal leg which straddles and releasably contacts the front edge of the upper end 41 of bus bar 18 while said ground prongs 83 and 84 releasably engage the vertical leg of the connector as at 82b and 82c.

The rear face of the back section 56 of module 11 is provided with vertical laterally spaced grooves 66, 66 for receiving the intermediate front edges of black and white bus bars 16 and 18, respectively (See FIGS. 3, 4 and 8-12), said rear face also having vertically alined recesses 67, 67 and their adjacent vertically alined short grooves 68, 68, respectively, therein. Recesses 67, 67 are adapted to telescopically fit over guides 69, 69 which, in turn, are integral with the front section 14 of module 10 while grooves 68, 68 fit over the front edge portions of the upper and lower ends 41, 41 of ground bus bar 18. When modules 10 are assembled in operative position (FIGS. 3 and 4), they are releasably connected by screws 57a, 57a as described earlier.

From the description in the three immediately preceding paragraphs, it is apparent that each of the five rearwardly projecting legs of the bar-type connectors 62, 62, 76, 79 and 82 is connectable and disconnectable to and from its associated bus bar end 41 of base module 10 in identically the same manner and in response to the telescopic insertion and removal of receptacle module into the opening 14a of the base module.

The circuitry for the combined modules 10 and 11 is diagrammatically illustrated in FIG. 18. The circuitry of module 10 is the same as previously described with reference to FIG. 17. Module 11 picks up contact at points 41 on the three bus bars. Connector 61 makes contact with the upper portion of black bus bar 16 at point 41 and supplies power to the outlet face of upper socket 70. Connector 62 makes contact with the upper portion 41 of the white or neutral bus bar 17 and provides connection of the neutral wire to outlet face or socket 70. Connector 82 makes contact with the ground bus bar 18 at its upper end 41 and provides ground connection to both outlet sockets 70 and 75. Connector 76 makes contact with the lower end 41 of black bus bar 16 and provides power to outlet socket 75. Connector 77 makes contact with the lower end 41 of the white or neutral bus bar 17 and provides the connection of the neutral wire to outlet face or socket 75. Thus, it is apparent that the above-described circuitry does not permit independent control of sockets 70 and 75.

Independent control of each of the sockets 70 and 75 may be obtained by removing break-out segments 43, 43 from bus bars 16 and 17, respectively, along their individual scored lines 42, 42 to thereby interrupt the flow of current through the two bars, and then revising the circuitry as illustrated in FIG. 19 wherein module 11 without segments 43, 43 is connected to base module 10. Power enters through external line 26 and makes contact with the top of black bus bar 16. Power is then picked up by connector 61 which, in turn, provides power to outlet socket 70. Line 27 represents the white or neutral wire entering module 10 and making contact with the top portion of the white bus bar 17. Connector 62 then makes contact with the upper end 41 of bar 17 and provides the neutral connection to outlet socket 70. Line 28 represents the ground wire entering module 10 and providing the ground connections as previously described in association with FIG. 18. Line 26a represents the second supply of power which enters the bottom of module 10 to provide power to the lower outlet socket 75 through connector 76. Line 27a represents the second white or neutral wire entering at the bottom of module 10 and making contact with the bottom portion of bus bar 17 to provide the neutral connection to the lower outlet socket 75 through connector 77. Line 28a represents the second ground wire entering from another source or control to the bottom of module 10 and making contact with the bottom of ground bus bar 18 and providing contact with both the top and bottom outlet sockets 70 and 75 as previously described.

FIGS. 13, 14, 14A, 15, 16 and 20 show the detailed construction of the wireless switch module 12 and the manner in which it is detachably connected to base module 10. Like modules 10 and 11, the switch module 12 is composed of back and front rectangular blocks or sections 86 and 87 which are made of non-conductive material, notched to receive the conductive elements, and then laminated face-to face along a plane or interface 88 to lock the elements therebetween. Modules 10 and 12 are are secured to one another by suitable screws, such as 57a shown in FIGS. 1 and 4, said screws adapted to penetrate bores 92, 92 in module 12 and then to be threadably secured on holes 69a, 69a of module 10.

More particularly, the legs 89c and 89a of the upper L-shaped current connector 89 extend horizontally rearwardly and vertically downwardly within module 12, respectively. In a similar manner, the legs 90c and 90a of lower connector 90 extend horizontally rearwardly and vertically upwardly, respectively, within module 12. The leg 89c is provided with an end notch 89d which connects with the upper end 41 of bus bar 16 and the leg 90c is provided with end notch 90d which connects with the lower end 41 of bus bar 16, in the same manner as previously described for connector 61.

The vertical leg 89a of connector 89 has a contact 89b on its lower end (FIGS. 13, 15 and 16), which contact engages and disengages a second contact 90b on the upper end of leg 90a of connector 90, said contact 89b being normally biased toward engagement with contact 89b by spring lever 89a. Contact 89b is disengaged from contact 90b by a disconnect arm 96 and a switch arm 97, the proximate ends of said arms being integral with a transversely disposed axle 98 mounted in opposed walls of opening 99 of the front block or plate 87 of module 12. A recess 100 in the front portion of back block 86 communicates with opening 99 to allow movement of the switch elements when contacts 89b and 90b are being opened and closed by arms 96 and 97 to thereby break and make the circuit. A stabilizer spring 101 in recesses 100 and 101a engages the free spring arm 89a to hold it in positive "on" and "off" positions.

The circuit for combined modules 10 and 12 is diagrammatically shown in FIG. 20 in which the module 10 is provided with the same circuitry as described in association with FIG. 17, except the break-out segment 43 of bus bar 16 has been removed. This allows for inserting module 12 (wireless control switch). If the switch is "on", power flows from line 26 to the upper end 41 of bus bar 16, on to connectors 89, 89a, 89b, 90a, 90b, 90c and 90 to the lower end 41 of bus bar 16, and then out wire 26a to a power-using device.

As previously described in association with FIGS. 1, 3, 7 and 8, the break-out segment 43 connects the proximate edges of black bus bar ends 41, 41 to provide an uninterrupted flow of current through the bar when base module 10 and receptacle module are connected. But when the module 10 and the switch module 12 are connected, the flow of current through bar 16 must be interrupted and, instead, diverted through the circuit leading from the upper end 41 of bar 16, through connector 89, switch contacts 89b, 90b, connector 90 to the lower end 41 of bar 16.

It is important, however, to avoid inadvertent connection of modules 10 and 12 before removing segment 43. Accordingly, the rear face of back block or section 86 of module 12 (FIGS. 13 and 14A) is provided with vertically alined upper and lower short grooves 102 and 103, respectively, with an ungrooved portion 104 separating the proximate ends of the grooves. As will be noted in FIG. 13, the short grooves accommodate the upper and lower ends 41, 41 of black bus bar 16 when segment 43 is removed, while the ungrooved portion 104 prevents insertion of module 12 into operative position in the event removal of segment has been overlooked. In other words, if segment 43 should remain in place and if portion 104 should be grooved to permit modules to be connected, power would be allowed to flow through module 10 without contral, thereby rendering the switch module inoperative.

I claim:

1. An electrical outlet structure adapted to have external wires connected thereto, comprising a non-conductive generally rectangular box consisting of a back wall with side walls and end walls forming a front opening;

laterally spaced and longitudinally extending hot, neutral and ground bus bars mounted in said box, the opposite ends of each of said bars terminating short of the respective outer surfaces of said end walls;

a one-way connector formed integrally with each of the opposite ends of said bus bars and terminating short of said outer wall surfaces, respectively;

said end walls being provided with a port individual to each connector and extending from the latter to the proximate end wall outer surface whereby the end of one of said wires may be pushed therethrough into engagement with the connector;

means carried by each of said connectors and responsive to the axial pressure of said wire ends for locking the latter against withdrawal through their respective ports, each of said hot and neutral bus bars being disposed edgewise in said box with its intermediate portion spanning said opening;

a non-conductive rectangular housing telescopically mountable in said opening;

a pair of outlet sockets mounted in said housing, one of said sockets being connectable between the end portions of said hot and neutral bars at one end of the housing and the other socket being connectable between the opposite end portions of the last-named bars, and means including intermediate break-out segments in said hot and neutral bars, respectively, for interrupting the flow of current through the latter bars to thereby establish independently controllable sockets.

2. An electrical wiring structure adapted to have external wires connected thereto, comprising
   a non-conductive generally rectangular box consisting of a back wall with side walls and end walls forming a front opening;
   laterally spaced and longitudinally extending hot, neutral and ground bus bars mounted in said box, the opposite ends of each of said bars terminating short of the respective outer surfaces of said end walls;
   a one-way connector formed integrally with each of the opposite ends of said bus bars and terminating short of said outer wall surfaces, respectively;
   said end walls being provided with a port individual to each connector and extending from the latter to the outer surface of the proximate end wall whereby the end of one of said wires may be pushed therethrough into engagement with the connector;
   means carried by each of said connectors and responsive to the axial pressure of said wire ends for locking the latter against withdrawal through their respective ports, said end walls being provided with a release port individual to each of said connectors and extending from the latter to the outer surface of the proximate end wall whereby external pressure may be applied through the release port to the connector, said connector being responsive to said last-named pressure to release the locked wire for withdrawal;
   each of said hot and neutral bars being disposed edgewise in in said box with its intermediate portion spanning the opening;
   a non-conductive rectangular housing telescopically mountable in said opening;
   a pair of outlet sockets mounted in said housing, one of said sockets being connectable between the end portions of said hot and neutral bars at one end of the housing and the other socket being connectable between the opposite end portions of the last-named bars, and
   means including intermediate breakout segments in said hot and neutral bars, respectively, for interrupting the flow of current through the latter bars to thereby establish independently controllable sockets.

3. An electrical outlet structure adapted to have external wires connected thereto, comprising
   a non-conductive generally rectangular box consisting of a back wall with side walls and end walls forming a front opening;
   laterally spaced and longitudinally extending hot, neutral and ground bus bars mounted in said box, the opposite ends of each of said bars terminating short of the respective outer surfaces of said end walls;
   a one-way connector formed integrally with each of the opposite ends of said bus bars and terminating short of said outer wall surfaces, respectively;
   said end walls being provided with a port individual to each of said connectors and extending from each connector to the proximate end wall outer surface whereby the the end of one of said wires may be pushed therethrough into engagement with the connector;
   means carried by each of said connectors and responsive to the axial pressure of said wire ends for locking the latter against withdrawal through their respective ports, each of said hot and neutral bus bars being disposed edgewise in said box with its intermediate portion spanning said opening;
   a non-conductive rectangular housing telescopically mounted in said opening; a switch mounted in said housing and connectable with the opposite end portions of said hot bus bar, and a break-out segment in the intermediate portion of said hot bus bar for interrupting the flow of current therethrough and diverting it to said connectable switch.

4. The structure defined in claim 3 and further comprising means carried by said housing for preventing the connection of said switch to the opposite ends of the hot bus bar before the intermediate segment in the latter is removed.

5. An electrical outlet structure adapted to have external wires connected thereto, comprising
   a non-conductive generally rectangular box consisting of a back wall with side and end walls forming a front opening;
   laterally spaced and longitudinally extending hot, neutral and ground bus bars in said box, each of said bus bars having a coupler for said wires on each of its opposite ends, and at least said hot and neutral bars being disposed in said box with its intermediate segment spanning said opening;
   a pair of outlet sockets in said housing, the first of said sockets being connectable between the ends of said hot and neutral bars at one end of the housing and the second of said sockets being connectable between the opposite ends of said last-named bars, and
   means for detachably securing said intermediate segments to said hot and neutral bus bars, respectively, whereby detachment of the segments will interrupt the flow of current through the bars to provide independently controllable first and second sockets.

6. An electrical wiring structure adapted to have external wires connected thereto, comprising
   a non-conductive generally rectangular box consisting of a back wall with side walls and end walls forming a front opening;
   laterally spaced and longitudinally extending hot, neutral and ground bus bars in said box, each of said bus bars having a coupler for said wires on each of its opposite ends, and at least said hot bar being disposed in said box with its intermediate segment spanning said opening;
   a non-conductive rectangular housing telescopically mounted in said opening;
   a switch mounted in said housing and connectable between the opposite ends of said hot bus bar, and
   means for detachably securing said intermediate segment to said hot bus bar whereby detachment of the segment will interrupt the flow of current through the bar and divert it to said connectable switch.

* * * * *